United States Patent Office 2,802,351
Patented Aug. 13, 1957

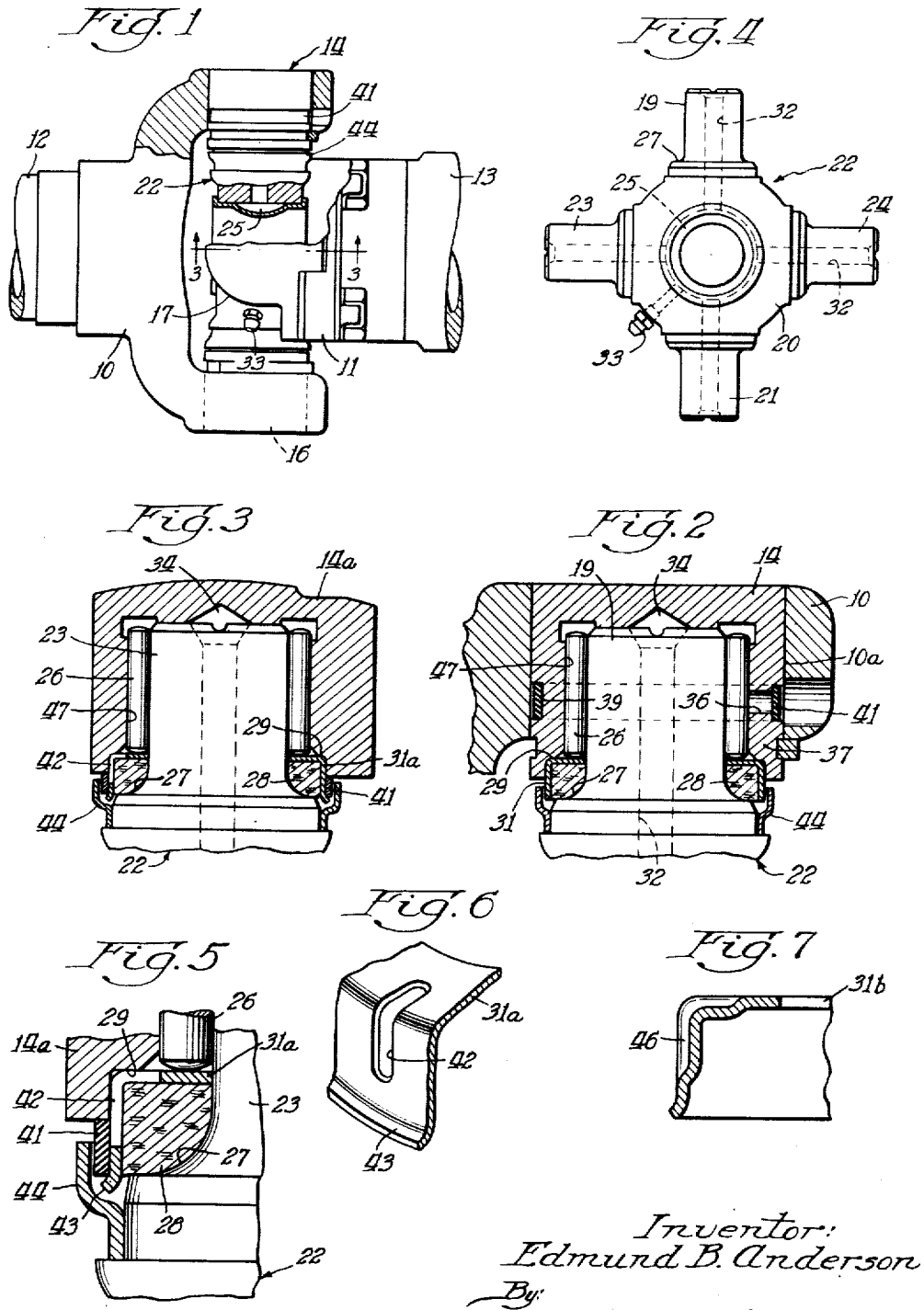

2,802,351

LUBRICATING MEANS FOR RELATIVELY ROTATABLE MEMBERS

Edmund B. Anderson, Rockford, Ill., assignor to Borg-Warner Corporation, Chicago, Ill., a corporation of Illinois Application November 1, 1954, Serial No. 466,003

4 Claims. (Cl. 64—17)

This invention relates to lubricating means for relatively rotatable members, such as employed in universal joints, and particularly adaptable to trunnion type universal joints, wherein the trunnions are supported in individual bearing blocks secured to yoke members of the universal joint.

An object of the invention is to provide improved lubricating means for relatively rotatable members.

Another object of the invention is to provide improved lubricating means for relatively rotatable members serving as valves to insure adequate lubrication of the bearings of the members, and operative to provide seals to maintain lubricant in the bearings of the members.

A still further object of the invention is to provide improved lubricant means in universal joints for assuring lubrication of the bearing surfaces of the engaged, relatively rotatable parts thereof.

A further object of the invention is to provide a novel method of lubricating trunnion bearings of universal joints.

Universal joints are illustrated embodying certain features of the present invention and may comprise a plurality of trunnions, sealed bearings for supporting said trunnions, means for introducing fluid under pressure into the bearings, and valve means associated with each bearing and responsive to fluid pressure for bleeding fluid from each bearing and serving as seals to maintain lubricant in the bearings.

A complete understanding of the present invention may be had from the following detailed description of various embodiments thereof when read in conjunction with the appended drawings, in which like numerals indicate identical parts throughout the several figures, and in which:

Fig. 1 is a side view of a universal joint of the trunnion type embodying the present invention with certain parts thereof broken away;

Fig. 2 is a vertical section of the upper bearing block and trunnion of Fig. 1 and shows one embodiment of the present invention;

Fig. 3 is a sectional view of Fig. 1 taken along the line 3—3 thereof and showing another form of the present invention;

Fig. 4 is a plan view of the spider of Fig. 1;

Fig. 5 is an enlarged view of a portion of Fig. 3;

Fig. 6 is an enlarged view of a portion of the retainer ring shown in Figs. 3 and 5;

Fig. 7 shows a modification of the retainer ring of Fig. 6.

Referring now to Fig. 1, there is shown an universal joint of substantially the same general construction as that disclosed in U. S. Patent No. 1,985,669 issued December 25, 1934 to C. E. Swenson. A pair of opposed yokes 10 and 11 are shown secured to driving and driven shafts 12 and 13, respectively. A pair of bearing blocks or casings 14 and 16 are secured to the yoke 10, while another pair of bearing blocks are secured to yoke 11, one of the blocks being shown at 17. A driving connection is established between the opposed yokes by a spider 22 having a body 20 provided with four radially extending trunnions, the trunnions 19 and 21 being received within the bearing blocks 14 and 16 respectively and the trunnions 23 and 24 of the spider 22 being positioned within the bearing blocks attached to the yoke 10. As shown in said Swenson patent, a plurality of roller bearings 26 are disposed within each bearing block and surrounding each trunnion. Disposed around each shoulder 27, formed on the spider 22, is an annular cork gasket 28 for enclosing the lower end of each bearing block and preventing lubricant in the joint, or forced into the joint from escaping between the gasket 28 and spider trunnions. Disposed between the cork gasket 28 and seated in a recess 29 of each bearing block is a cup-like retainer 31 positioning the roller bearings as shown.

Each spider trunnion is formed with a central passageway as at 32 communicating with a cavity 25 formed in the spider 22 so that the introduction of fluid under pressure into the spider through a suitable valve 33, such as a conventional grease fitting, will cause the fluid to flow from the spider radially through the trunnions to the bottom wall 34 of each bearing block. Sufficient clearance is provided between the ends of the trunnions and the bottom wall of each bearing block to permit fluid under pressure to flow radially from the outer end of each trunnion to the roller bearings and the opposed bearing surfaces of the trunnions and bearing block engaging the roller bearings for lubricating the same.

In the embodiment of the invention shown in Fig. 2 an aperture or passage 36 is formed in the vertical wall 37 of each bearing block. An annular groove 39 is formed in the outer cylindrical surface of each bearing block intersecting the aperture 36. A resilient band 41, such as an annular synthetic plastic band which may be neoprene, or a split spring steel band, is positioned in the groove 39 and tightly engages the bottom wall defining the groove 39 thereby normally sealing the aperture 36 from dust-laden atmosphere and to normally seal the opening 36 to prevent escape of lubricant. Thus, the band 41 tightly closes the aperture 36 for the purpose described but, it will be noted, is slightly spaced from the adjacent wall 10a of the yoke 12 for the reason now described.

Upon the introduction of lubricating fluid under pressure into the hollow body 25 of the spider 22, the fluid will flow along the path previously described. As the fluid flows into the bearing block and around the roller bearings 26 surrounding each trunnion, the pressure of the fluid will cause the band 41 to expand and uncover the aperture 36 to vent each bearing block of entrapped air until ultimately the fluid under pressure will be discharged through the aperture, so uncovered, and pass between the engaged surfaces of the blocks and yokes to the atmosphere. Of course, if the bearing block is already filled with old spent lubricant fluid, the introduction of new lubricant fluid will operate to purge the block of the spent lubricant fluid. When the application of lubricant fluid under pressure to the joint ceases, the flexible band 41 will contract to again seal the aperture 36 from the atmosphere.

In the embodiment of the invention shown in Figs. 3, 5, and 6, the annular cup-like retainer 31a is similar to the retainer 31 of Fig. 2, but differs therefrom by being formed with a slot 42 in the bottom and cylindrical side walls thereof, the particular configuration of which is more readily apparent in Fig. 6. In this embodiment of the invention, no aperture, such as the aperture 36, is provided in the side wall of the bearing block as required in the form of the invention shown in Fig. 2. Instead, the portion of the bearing block 14a surrounding the retainer ring, is shortened slightly to permit the introduction of the flexible band 41 at the point shown in detail in Figs. 3 and 5. The band 41 can take the form of and is similar to the band described in the embodiment of the invention shown in Fig. 2. Referring now to Fig. 5, the band 41 is positioned with respect to the cylindrical wall of the retainer 31a so that the upper end of the band 41 tightly engages the bottom edge of the bearing block and the cylindrical wall of the retainer 31a and covers that portion of the slot 42 of the retainer 31a extending below the bearing block to normally provide a seal for the lubricant in the joint. The retainer 31a is provided with a flared portion as at 43 to maintain the band in position.

It is to be understood that the band 41 can be made of a variety of fluid-impervious commercially available plastic resilient materials, such as neoprene, or may be formed of spring steel and is designed so as to flex or expand in response to a predetermined fluid pressure. The band can be circular, or define only a portion of the circumference of a circle. The band 41 in conjunction with an aperture, such as the aperture 36, or a slot, such as the slot 42, may be considered to function as a seal and to be a one-way valve.

Fig. 7 represents a modification of the invention in which the retainer 31b is similar to the retainer 31a of Fig. 6 but a groove 46 is provided in the retainer 31b in lieu of the slot in the retainer 31a. It is, of course, understood that the groove 46, the slot 42 or the aperture 36 communicates with the interior of the bearing block 14a, specifically the annular space 47 which accepts the roller bearings 26, and provides a passageway or outlet for fluid therethrough.

In all embodiments of the invention, a circular guard 44 is provided in order to protect the band 41 or the cups 31, 31a or 31b, as the case may be.

It is to be understood that, in the practice of this invention, a fluid under pressure, such as a lubricant, may be introduced through the lubricant fitting 33 to the hollow cavity 25 of the spider 22 and caused to flow as previously described to the various bearing blocks simultaneously. Continued application of the fluid pressure will cause the fluid to fill the interstices adjacent all roller bearings until, upon the additional application of fluid under pressure, the fluid will flow through the apertures 36, or through the slots 42, or the grooves 46, as the case may be, causing the bands 41 to expand uniformly and uncover the outer end of said aperture, slot or groove, thus permitting the fluid to emerge from each bearing block simultaneously. The particular advantage, of course, of this universal joint construction and method of lubrication is the assurance of an adequate supply of lubricant to each bearing block without having to apply lubricant to the bearing blocks individually. One has only to observe the appearance of fluid flowing from each aperture, slot or groove, as the case may be, in any particular universal joint in order to be assured that all four bearings have been lubricated.

A further advantage of the present invention is the provision of means for sealing out moisture, sand and other soil material from the interior of the bearings. The present invention also provides a quick and facile means for not only introducing fluid into the bearing for the first time, but also provides a scheme for purging each bearing of undesirable lubricant while fresh lubricant is being injected therein.

As stated before, the invention contemplates that the flexible band 41 may be composed of either natural or synthetic rubber, or any other non-metallic material having the ability to return to its original shape to normally form a seal preventing escape of lubricant after stretching or deformation to provide a valve for the escape of lubricant under pressure. The band also may be made of flexible metallic materials, such as spring steel.

While I have shown the invention as applied to universal joints, it will be apparent that it is equally applicable to other bearing assemblies which lend themselves to lubrication individually or from a central point.

The embodiment of the invention shown and described is merely for the purpose of illustrating the invention and it is not to be limited thereto in its application.

I claim:

1. In a universal joint, a pair of opposed yoke members, an intermediate spider having trunnions, bearing blocks fastened to said yoke members for receiving said trunnions and for connecting the yoke members and the spider pivotally, means for introducing fluid under pressure to said bearing blocks, each said bearing block having an apertured wall, and means for sealing each bearing block including valve means cooperating with the apertured wall and responsive to fluid pressure effective to render said sealing means ineffective.

2. In a universal joint, a pair of opposed yoke members, an intermediate spider having trunnions, bearing blocks fastened to said yoke members for receiving said trunnions and for connecting the yoke members and the spider pivotally, means for introducing fluid under pressure to said bearing blocks, each said bearing block having a curved apertured wall, and means associated with each said apertured wall and for sealing each bearing block including a normally closed valve means responsive to fluid pressure effective to render said sealing means ineffective.

3. In a universal joint, a pair of opposed yoke members, an intermediate spider having trunnions, bearing blocks fastened to said yoke members for receiving said trunnions and for connecting the yoke members and the spider pivotally, each said bearing block having a wall, means for sealing each bearing block, means for introducing fluid under pressure to each bearing block, and a normally closed valve means mounted upon said wall and operable in response to a predetermined fluid pressure to open said valve.

4. In a universal joint, a pair of opposed yoke members, an intermediate spider having trunnions, sealed bearing blocks fastened to said yoke members for receiving said trunnions and for connecting the yoke members and the spider pivotally, each said bearing block having an aperture communicating with the atmosphere, a resilient band surrounding each bearing block for closing each aperture, each said band being movable in response to fluid pressure to uncover each aperture, means for introducing fluid into each bearing block under pressure sufficient to cause each band to uncover its corresponding aperture thereby permitting fluid to flow from each bearing block simultaneously.

References Cited in the file of this patent

FOREIGN PATENTS 648,807     Great Britain  _____ Jan. 10, 1951

UNITED STATES PATENT OFFICE
CERTIFICATE OF CORRECTION

Patent No. 2,802,351                            August 13, 1957

Edmund B. Anderson

It is hereby certified that error appears in the printed specification of the above numbered patent requiring correction and that the said Letters Patent should read as corrected below.

Column 4, lines 33 and 34, strike out "associated with each said apertured wall and" and insert the same after "means" in line 35, same column.

Signed and sealed this 15th day of October 1957.

(SEAL)
Attest:
KARL H. AXLINE

Attesting Officer

ROBERT C. WATSON
Commissioner of Patents